United States Patent

[11] 3,532,044

| [72] | Inventor | Jun Shimomura |
| | | Tokyo, Japan |
| [21] | Appl. No. | 703,316 |
| [22] | Filed | Feb. 6, 1968 |
| [45] | Patented | Oct. 6, 1970 |
| [73] | Assignee | Nippon Kogaku K.K. |
| | | Tokyo, Japan |
| | | a corporation of Japan |
| [32] | Priority | Feb. 17, 1967 |
| [33] | | Japan |
| [31] | | 42/13,360 |

[54] DEVICE FOR RAISING OR LOWERING THE REFLECTING MIRROR OF SINGLE LENS REFLEX CAMERAS
5 Claims, 3 Drawing Figs.

[52] U.S. Cl..................................................... 95/42, 352/206
[51] Int. Cl............................................................ G03b 19/12
[50] Field of Search............................................. 95/42; 352/206

[56] References Cited
UNITED STATES PATENTS
2,891,454  6/1959  Sauer et al............... 95/42

Primary Examiner—John M. Horan
Assistant Examiner—Richard L. Moses
Attorney—Anton J. Wille ABSTRACT: A support for the reflecting mirror in a single lens reflex camera of the interchangeable lens type is provided whereby the forward edge of the mirror is retracted to clear the rear portion of an interchangeable lens mounted on the camera body. The reflecting mirror forms a part of a folding or collapsible linkage which may be in the form of a parellelogram. A driving lever rotated by the mirror actuating mechanism of the camera and pivoted to one corner of the linkage expands and folds the linkage in raising and lowering the mirror.

Patented Oct. 6, 1970  3,532,044

DEVICE FOR RAISING OR LOWERING THE REFLECTING MIRROR OF SINGLE LENS REFLEX CAMERAS

This invention relates to an improvement of the device for raising or lowering the reflecting mirror in a single lens reflex camera of interchangeable lens type.

In a conventional reflecting mirror arrangement provided in single lens reflex cameras, the driving shaft for the reflecting mirror is so positioned within the camera body that when a wide angle lens of short back focus is mounted on the camera, the forward end of the mirror abuts on the rear portion of the lens when the reflecting mirror is raised. It is, therefore, not always possible to provide a single lens reflex camera with a wide variety of interchangeable lenses due to the difficulties encountered in raising and lowering the mirror.

On the other hand, when a lens of long focal length is mounted on the camera, the size of the reflecting mirror must be sufficiently large to receive the total light rays so that the end of the reflecting mirror must be brought forward.

In order to solve these two problems simultaneously, the rotary shaft for the reflecting mirror should be retreated when it is raised or lowered, and there have already been made such proposals. However, any of the conventional devices utilizes sliding mechanism at a part thereof so that the motion efficiency has to be sacrificed.

Generally speaking, a single lens reflex camera has a restrictive condition that a too strong force must not be given to the reflecting mirror because shock must be prevented and therefore it is preferable that a rotary mechanism having a high motion efficiency should be used in the devices of this type, and the mechanism must be small enough to be easily built into a limited narrow space.

The object of this invention therefore provides a novel reflecting mirror actuating device satisfying the above-mentioned conditions.

According to the present invention, a device for raising or lowering the reflecting mirror in single lens reflex cameras of the interchangeable lens type is provided in which device comprises a main link on which a rotary shaft of the reflecting mirror is provided, one end of the main link being rotatably supported on a fixed portion of the camera; two auxiliary links, one end of each being rotatably connected to each other and the other end of each being rotatably connected to substantially middle portions of the reflecting mirror and the main link, respectively; the folding direction of the mutually connected auxiliary links being made opposite to the folding direction of the mutually connected reflecting mirror and the main link so as to form a quadrilateral with these four members of the two auxiliary links, the main link and the reflecting mirror; and a reflecting mirror driving member, one end of which being rotatably connected to either of the auxiliary links and the remaining end of which being rotatably connected to a fixed portion of the camera.

The present invention will be described more in detail with respect to an illustrative embodiment shown in the accompanying drawing, in which.

Figure 1:
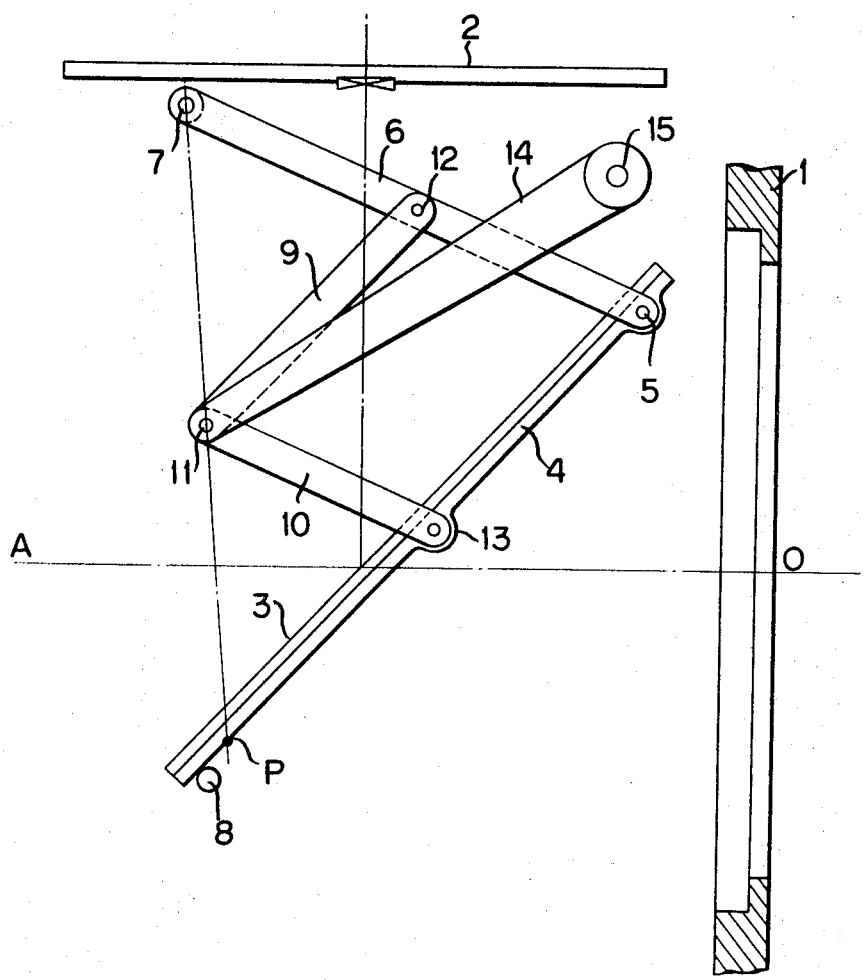
FIG. 1 is a side view of an illustrative embodiment of the present invention, in which the reflecting mirror is in its reflecting or lowered position.

In the drawing, 1 is a film image surface, 2 is a finder focussing plate, 3 is a reflecting mirror, 4 is a supporting plate for the reflecting mirror 3 and is rotatably supported at one end of a main link 6 through a pin 5.

The main link 6 is rotatably supported by a fixed shaft 7 provided on the fixed portion of the camera, 8 is a limiting member for setting the reflecting mirror 3 at the reflecting position of 45° to the optical axis AO of the objective lens (not shown). Two auxiliary links 9 and 10 are provided and interconnected at their ends by a pin 11 and connected respectively to the center portion of the link 6 by a pin 12 and of the supporting plate 4 by a pin 13. The mirror support and links form a parallelogram, pantograph or lazy tongs, or a quadrilateral. A driving lever 14 is provided for the reflecting mirror 3, one end of which is fixed on the drive-shaft 15 rotatably mounted on the fixed portion of the camera while the other end is pivoted on the pin 11 interconnecting the links 9 and 10. The lever 14 can be rotated by a predetermined amount in the clockwise direction when the reflecting mirror 3 is raised, and when the reflecting mirror is lowered, in the counterclockwise direction by the conventional reflecting mirror actuating mechanism (not shown).

Figure 2:
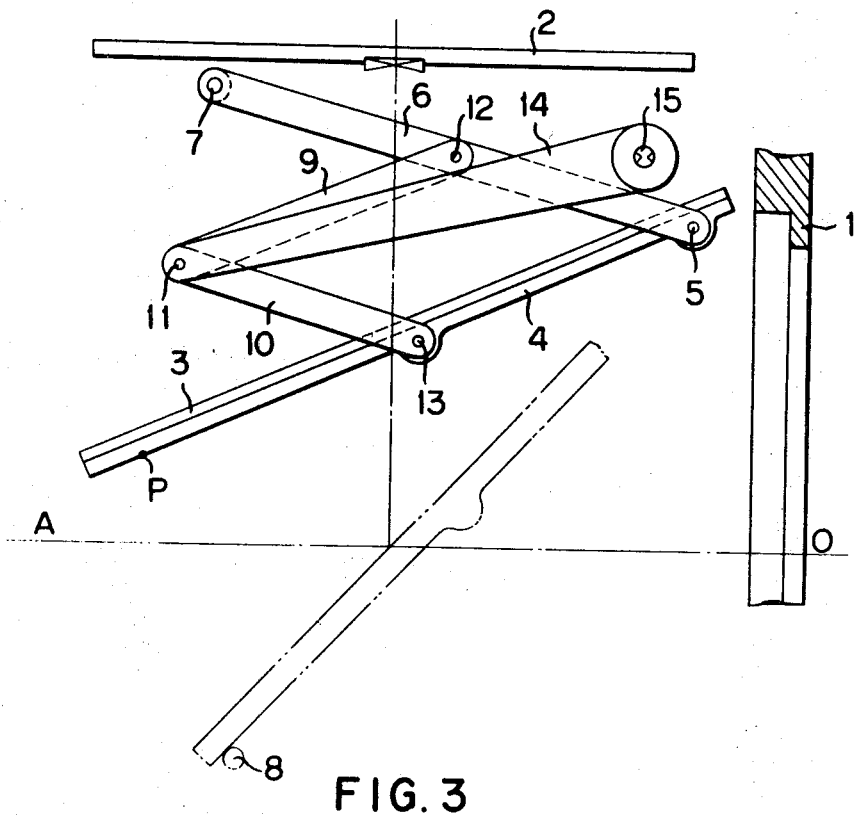
FIG. 2 is a side view as the same as shown in FIG. 1, however, in FIG. 2, the reflecting mirror possesses a location intermediate its raised and lowered positions.
Figure 3:
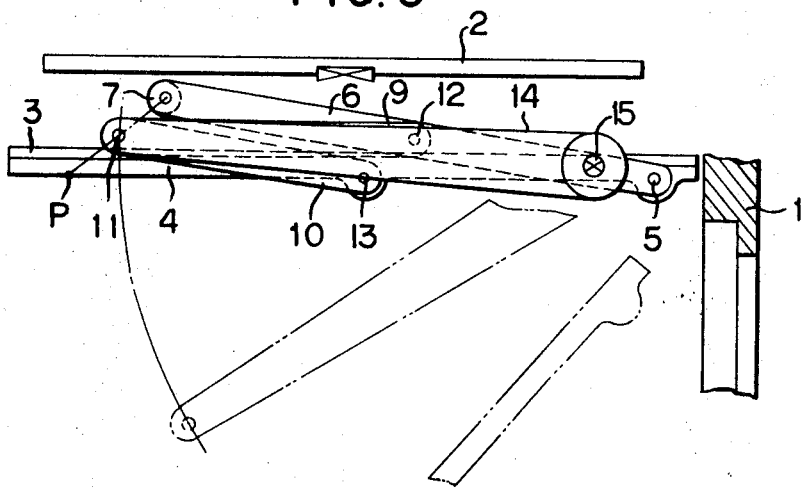
FIG. 3 is a side view as the same as shown in FIG. 1, however, in FIG. 3, the reflecting mirror is in its raised position.

The structure of the device of this invention is as explained above, and when the drive-lever 14 is rotated in the clockwise direction by pushing the shutter button of the camera (not shown), the supporting plate 4 is rotated in the clockwise direction as is shown in FIG. 2, and at the same time the main link 6 is rotated in the counterclockwise direction to raise the reflecting mirror 3 and retracting the front edge thereof to clear the rear of any lens which may be mounted on the camera. With the linkage fully collapsed as shown in FIG. 3, mirror 3 is raised to such a degree that the lower part of the focussing plate 2 is light shielded.

When the reflecting mirror is lowered, it is turned back to the reflecting position by the operation opposite to the raising operation.

In considering the space available within the camera housing for mounting the reflecting mirror and the arcuate path of the forward edge of the mirror, the linkage lengths and length of the driving lever are determined by laying out possible traces or paths for the forward edge of the mirror. If a point P on the mirror support plate 4 is presumed to be on the extension of a line drawn through the pins 7 and 11 with the mirror in its viewing position (FIG. 1), the arcuate path of the point P will be similar to the arcuate path of the pin 11. With the length and operational angle of the driving lever 14 as a starting point, the remaining linkages can be determined to provide for the unobstructed path of the mirror edge.

The position of the rotary shaft 15 of the drive-lever 14 is not restricted to the right side as is shown in the drawing, it can be placed on the left side (on the side of the auxiliary links), and the quadrilateral formed by the respective members 4, 6, 9, and 10 need not be a parallelogram. The connecting point of the drive-lever 14 can be any place as long as it is on the auxiliary link, and each one end of the respective auxiliary links can be separately provided on the drive-lever without connecting the same directly.

When the device of this invention is employed, the reflecting mirror can be actuated only by the rotary mechanism in raising it while retracting the same, and therefore when compared with the conventional devices of this type, motion efficiency can be remarkably improved, and since the auxiliary links are adopted, designing can be done freely, and when the position of the rotary shaft 15 of the drive lever should be provided in a relatively closer position, the operation angle of the drive lever relative to the operation angle of the reflecting mirror can be made smaller, and therefore it is very easy to provide the device of this invention within narrow space.

As is shown in the embodiment, when the parallelogram link is used, there is another advantage that the presumed trace of the end of the reflecting mirror can be easily introduced.

I claim:

1. A device for raising and lowering a reflecting mirror in a single lens reflex camera provided with a mirror raising and lowering mechanism, the combination comprising:

a main link pivoted at one end on a fixed shaft in the camera body and at the other end to the mirror;

two auxiliary links rotatably interconnected at one end to each other and rotatably connected substantially at the middle portions of the main link and the mirror, respectively; the main link, auxiliary links and mirror forming a quadrilateral; and a driving lever mounted for rotation at one end by the mirror mechanism of the camera and rotatably mounted at the other end to one of the auxiliary links.

2. A device as set forth in claim 1, wherein the main link, auxiliary links and mirror form a parallelogram.

3. A device as claimed in claim 1 in which the one end of the driving member is rotatably connected to the connecting joint of the two auxiliary links.

4. A device as claimed in claim 1, in which a point on the extension of the line connecting a fixed shaft for the main link and the connecting joint of the two auxiliary links draws a similar path to the trace of the connecting joint of the two auxiliary links.

5. The structure for raising and lowering the reflecting mirror of a single lens reflex camera comprising:

a collapsible quadrilateral wherein one side is formed by the reflecting mirror and a side adjacent the mirror is rotatably connected to the mirror at one end and rotatably mounted at the other end to the camera body; and a rotatable driving lever rotatably connected to one of the sides opposite the mirror and mirror adjacent side.